May 23, 1967     M. ORAIN     3,321,256
BEARING TRUNNIONS
Filed Sept. 28, 1964     2 Sheets—Sheet 1
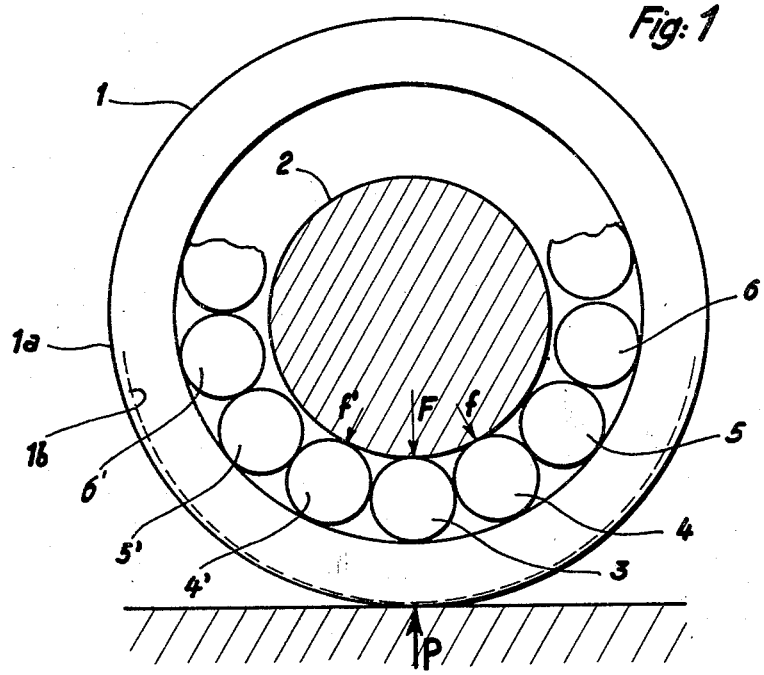
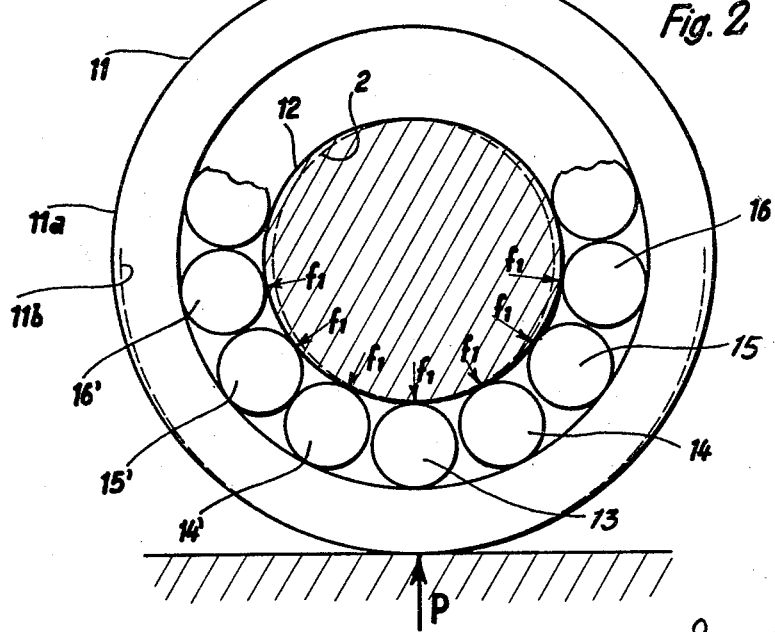
Inventor:
Michel Orain
BY Baldwin & Wight
Attorneys

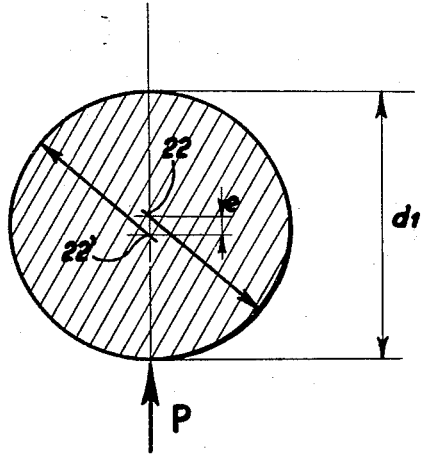
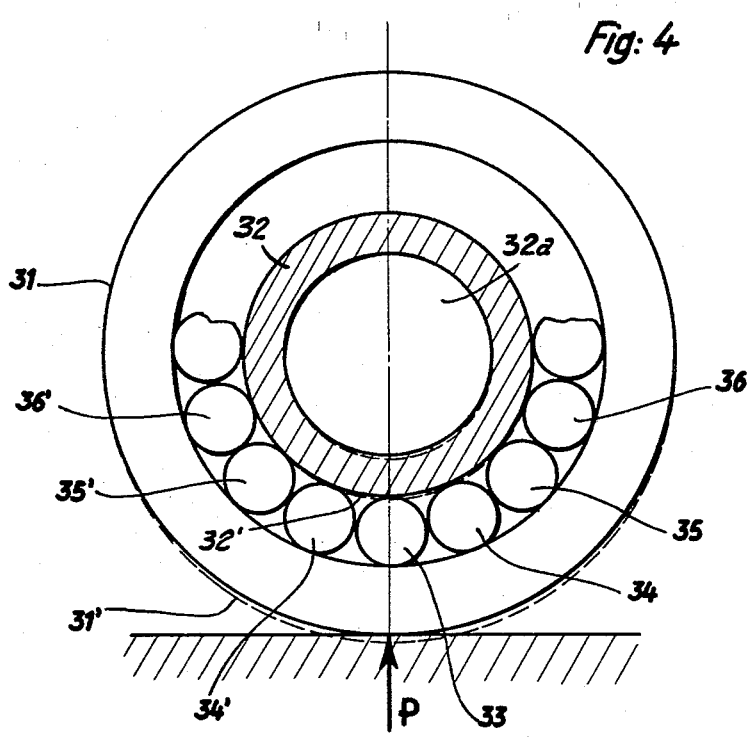

United States Patent Office 3,321,256
Patented May 23, 1967

3,321,256
BEARING TRUNNIONS
Michel Orain, Courbevoie, France, assignor to Glaenzer Spicer Société Anonyme, Poissy, France, a corporation of France
Filed Sept. 28, 1964, Ser. No. 399,661
Claims priority, application France, Oct. 2, 1963, 949,339/63
3 Claims. (Cl. 308—190)

The present invention relates to a bearing trunnion or inner shaft having a novel and particular shape which enables the value of admissible loads on bearings or bearing blocks to be considerably increased, especially in cases where the load does not turn appreciably in relation to the shaft, whether the shaft itself forms the inner ring of the bearing or bearing block or whether it acts as a mounting for the said inner ring.

The invention is especially applicable when the outer ring of the bearing or bearing block which turns in relation to the load consists of a roller which bears said load on a generatrix, as is the case with a cam follower roller for example.

It is known that when a practically radial load is applied to a roller-trunnion system the transfer of the load from the roller to the trunnion only occurs on a very small part of the cylindrical bearing surface of said trunnion. Furthermore, the pressure is unevenly distributed across the arc of the trunnion cross section, or contact arc center: said pressure has a zero value at the ends of said contact arc and is extreme at the central point of said arc, i.e. on the radius coinciding with the direction of the load. Such a concentration of pressure at the vertical of the load is due, first, to the radial clearance between the trunnion, the rolling elements and the bore of the ring and, secondly, to the elastic distortion to which the rim of the ring is submitted under the effect of the load and which tends to produce a localized increase in the radius of curvature of the bore of this ring.

A similar load distribution occurs as well for a smooth bearing roller where the bore rests directly on the cylindrical bearing surface of the trunnion, as in the case of a roller transferring the load to the trunnion or inner shaft through rolling elements such as balls, spindles, cylindrical or conical rollers, and the like. It can thus be seen that the various load transfer members, or parts of members are called upon to do an unequal amount of work with the result that functional difficulties eventually occur which may necessitate the complete replacement of device.

According to the present invention a very much increased radial load capacity is obtained owing to a practically uniform distribution along the bearing surface of the trunnion, of the pressure or loads which are applied in one or more substantially constant directions with respect to the longitudinal axis of the trunnion, by locally increasing the radii of curvature of the respective areas of application of the said loads on the trunnion without prejudicing the continuity of the cylindrical surface of said trunnion.

The cross section of the trunnion can be obtained by preliminary machining, but it is also possible to obtain a trunnion with a radial elastic distortion capacity such that it adapts to the exterior ring under the effect of the load, the local increase of the radius of curvature in the area of application of the load being obtained in this case owing to the elasticity of the trunnion itself.

In the case where a single load of a substantially constant direction is applied to the trunnion, the said trunnion should have a substantially elliptical profile the direction of the load then being that of the short axis of the ellipse.

It is also possible to give the trunnion the cross section according to the invention, for example a practically elliptical profile, at the time when the said trunnion is being mounted, especially in the case where the trunnion does not come into direct contact with the roller or with the bearing members. The invention can thus be applied to ordinary bearings manufactured in the normal way, whether they be ball, roller, spindle or even smooth bearings. To take advantage of the increase in the load, according to the invention, the inner ring of the said bearings, which are meant more particularly to play the part of a roller, is mounted on an axis having a slightly oval or elliptical cross-section, the short axis of the ellipse being directed approximately in the direction of the main load. Under these conditions the inner ring takes the elliptical cross-section of the axis, either on mounting if the inner ring is adjusted tightly on the axis, or when the load is applied if the inner ring is mounted to slide on the axis. In all cases the rolling or sliding race of the inner ring has a radius of curvature which is slightly greater towards the main load, and thus the capacity of the bearing is noticeably increased.

The invention is more fully described hereinafter with reference to the appended drawings in which:

FIG. 1 is a diagrammatical, cross sectional view of a conventional cylindrical trunnion to which a radial load P applied to a roller is transmitted through rolling members;

FIG. 2 is a similar view showing the distribution of the load on an inner trunnion according to the invention;

FIG. 3 is a cross sectional view of an embodiment of an inner trunnion made according to the invention;

FIG. 4 is a cross sectional diagrammatic view of a complete bearing including an elastically deformable inner trunnion according to the invention.

FIG. 1 shows the distribution of the load on a conventional roller-rolling members-trunnion unit or bearing assembly subject to a radial load P. The roller or ring member is shown at 1, the trunnion at 2, and the rolling elements at 3, 4, 4', 5, 5', 6, 6' etc. F, f and f' are diagrammatic representations of the reaction forces opposing load P. It has been shown that while the rolling member 3, placed immediately below load or force P is overstressed (force F) the rolling members 4, 4' bear a very small force f, f', and the rolling members 5, 5' and 6, 6' bear none at all. When roller 1 bears no load it has the circular shape shown by the dotted line 1b, but under the effect of the load P it takes the shape of the continuous line 1a and its bore has a greater radius of curvature in the area where load P is applied.

FIG. 2 is a diagrammatic representation of a bearing assembly having a trunnion according to the invention with the equal distribution of the forces $f_1$ to which the system formed by the roller 11, the rolling members 13, 14, 14', 15, 15', 16, 16', etc., and the trunnion 12 are submitted under the effect of a radial load P, in a substantially constant direction with respect to the trunnion or the longitudinal axis thereof.

Trunnion 12 is of generally cylindrical outer surface and has a substantially elliptical cross section load P being directed approximately in the direction of the shortest axis of said ellipse. The radius of curvature 11b of roller 11 (dotted line) becomes radius 11a (continuous line) under the effect of the load. Owing to the shape of the trunnion according to the invention all the rolling members transfer about the same force $f_1$, as the curve of the trunnion 12, being at a maximum at the vertical of load P, is better adapted to the curvature 11a of the roller.

As can be seen from FIG. 3, the localized increase of the radius of curvature $r$ of the trunnion can be obtained, for example, by two successive machinings around two centers 22 and 22', separated by the distance $e$. If $d_1$ is the diameter of the trunnion in the direction of the load, the radius of curvature $r$ at the vertical of load P is therefore:

$$r = d_1/2 + e/2$$

The trunnion can also be given an oval or elliptical profile by using a special grinding machine.

The trunnion can also be given the desired cross-section by a plastic deformation between two jaws, after being subjected to a preliminary cylindrical machining.

An elliptical or oval shape can also be obtained by inclining the generating plane on the plane perpendicular to the axis of the trunnion. The above mentioned methods of obtaining the trunnion profile according to the invention are not limitative and are only given as examples.

According to a different method of carrying out the invention, exemplified by FIG. 4, the trunnion 32 is given a sufficient diametrical elastic flexibility by an inner boring 32a for example, whereby the trunnion is formed into a hollow tubular configuration which allows it to adapt to the deformation of the outer ring 31 under the effect of load P. The respective positions of the ring and the trunnion at rest, that is to say in the absence of any load, are shown by the dotted lines 31' and 32'. Owing to the radial elastic deformation of the trunnion the overall load is distributed substantially equally over the rolling members 33, 34, 34', 35, 35', 36, 36', etc. An oval cross-section can also be given to elastic trunnions of the type of the hollow trunnion 32 shown at FIG. 4. During machining it is possible to force an auxiliary member into the bore of the trunnion which gives a diametrical elastic expansion to the trunnion, and which is removed after grinding; by this method a trunnion with a substantially elliptical profile is obtained.

On the other hand, in a case where several loads can occur either successively or simultaneously in several directions which are substantially constant with respect to the trunnion, according to the invention, the respective radii of curvature of the trunnion, corresponding to the areas or sectors where the said loads are applied, are increased. Such sectors are made to smoothly merge with the areas of smaller radius of curvature.

In this case it is also possible to use conventional bearings, as has already been stated, by increasing the radii of curvature of the supporting shaft in the areas where the loads are applied.

By way of example, a roller formed of a ring-shaped roller having an outer diameter of 30 mm. and an outer diameter of 20 mm. was mounted on a trunnion having an average outer diameter of 16 mm. by means of needles having a diameter of 2 mm. The unit was intended to bear a load of 400 kg. exerted in a direction perpendicular to the longitudinal axis of the trunnion. According to the invention, the cross section of the trunnion was given through previous machining the shape of an approximate ellipse in which the difference between the long and short axes was .04 mm., the said short axis being placed parallel to the direction of the load. The wear of the various members of such a unit was considerably reduced with respect to that of the same unit comprising a trunnion having a circular cross section.

Generally speaking, the difference between the greater and smaller diameters of a trunnion according to the present invention is of the order a few hundredths of millimeter according to the load to be borne, and to the dimension and shape of bearing surfaces.

What I claim is:

1. A radially loaded bearing assembly having a loading force applied thereon from an established direction thereby defining a predetermined loading zone, said bearing assembly comprising a spindle fixed against rotary movement and having an outer surface defining an inner bearing race, a rolling member having an inner surface defining an outer bearing race, and a plurality of rolling bearing elements disposed between said inner and outer bearing races and mounting said rolling member on said spindle for rotation thereabout, said rolling member inner surface being normally of a circular section and being elastically deformed under said loading force to a generally elliptical section having a major axis normal to the direction of said loading force, and said spindle outer surface also being of a generally elliptical section uniformly spaced from said rolling member inner surface throughout said loading zone thereby eliminating the usual undesirable constriction of the loading zone due to the deformation of said rolling member and formation of tapering throats at entrance and exit ends of said loading zone.

2. The bearing assembly of claim 1 wherein said spindle outer surface is of said generally elliptical section in an unloaded condition.

3. The bearing assembly of claim 1 wherein said spindle is of a tubular construction, is of a circular section in an unloaded condition, and is formed of a material subject to elastic deformation under load similar to the elastic deformation of said rolling member.

References Cited by the Examiner

UNITED STATES PATENTS 3,073,134   1/1963   Mann _____ 64—23

References Cited by the Applicant

UNITED STATES PATENTS 2,983,559   5/1961   Blinder.
2,990,226   6/1961   Fangman.
3,161,081   12/1964   Musser.

MARTIN P. SCHWADRON, *Primary Examiner.*

FRANK SUSKO, *Examiner.*